(12) United States Patent
Wang et al.

(10) Patent No.: US 11,348,496 B2
(45) Date of Patent: May 31, 2022

(54) DETECTING METHOD AND DETECTING CIRCUIT OF LCD PANEL

(71) Applicant: SHENZHEN CHINA STAR OPTOELECTRONICS SEMICONDUCTOR DISPLAY TECHNOLOGY CO., LTD., Shenzhen (CN)

(72) Inventors: Chaoqun Wang, Shenzhen (CN); Kewei Wu, Shenzhen (CN)

( * ) Notice: Subject to any disclaimer, the term of this patent is extended or adjusted under 35 U.S.C. 154(b) by 377 days.

(21) Appl. No.: 16/626,542

(22) PCT Filed: Dec. 19, 2019

(86) PCT No.: PCT/CN2019/126642
§ 371 (c)(1),
(2) Date: Dec. 25, 2019

(87) PCT Pub. No.: WO2021/114354
PCT Pub. Date: Jun. 17, 2021

(65) Prior Publication Data
US 2021/0364782 A1  Nov. 25, 2021

(30) Foreign Application Priority Data
Oct. 12, 2019 (CN) .......................... 201911257246.6

(51) Int. Cl.
*G09G 3/00* (2006.01)
*G02F 1/13* (2006.01)
(52) U.S. Cl.
CPC ........... *G09G 3/006* (2013.01); *G02F 1/1309* (2013.01)

(58) Field of Classification Search
CPC ................. G09G 3/006; G09G 3/3648; G09G 2320/0223; G09G 2330/10; G09G 2330/12; G02F 1/1309
See application file for complete search history.

(56) References Cited

U.S. PATENT DOCUMENTS

| 8,436,632 B2 * | 5/2013 | Baek ...................... G09G 3/006 |
| | | 362/558 |
| 9,442,478 B2 * | 9/2016 | Barrenscheen .... G05B 19/0428 |
| | (Continued) | |

FOREIGN PATENT DOCUMENTS

| CN | 201315147 Y | 9/2009 |
| CN | 103817782 A | 3/2014 |
| | (Continued) | |

*Primary Examiner* — Akm Zakaria (57) ABSTRACT

A detecting method and a detecting circuit of a LCD panel are provided. The method includes steps of: a detecting module in real time detecting a waveform of a pulse detecting signal inputted into the LCD panel; providing a feedback of the waveform of the pulse detecting signal to a pulse output module; determining whether the waveform of the pulse detecting signal is deformed by the pulse output module; correcting the pulse detecting signal by the pulse output module if the waveform of the pulse detecting signal is determined to be deformed; inputting a corrected pulse detecting signal to the LCD panel to detect the LCD panel. The disclosure prevents from abnormal display panel images resulted from a shorting bar lit-up method, reduces over checking or missing, and find out defects quickly and correctly by operators or detecting equipment to enhance quality and benefits and to reduce cost.

10 Claims, 6 Drawing Sheets

(56) References Cited

U.S. PATENT DOCUMENTS

| | | | |
|---|---|---|---|
| 9,990,873 B2* | 6/2018 | Jang | G09G 3/006 |
| 2012/0306939 A1 | 12/2012 | Choi | |
| 2015/0241501 A1* | 8/2015 | Jang | G09G 3/006 |
| | | | 324/527 |
| 2017/0064297 A1 | 3/2017 | Kim | |
| 2018/0197446 A1 | 7/2018 | Lee et al. | |
| 2019/0012959 A1* | 1/2019 | Wang | G09G 3/006 |

FOREIGN PATENT DOCUMENTS

| | | |
|---|---|---|
| CN | 104867430 A | 8/2015 |
| CN | 105448217 A | 3/2016 |
| CN | 106292344 A | 1/2017 |
| CN | 106384578 A | 2/2017 |
| CN | 107340415 A | 11/2017 |
| CN | 107967905 A | 4/2018 |
| CN | 108288458 A | 7/2018 |
| CN | 108562839 A | 9/2018 |
| CN | 109001578 A | 12/2018 |

\* cited by examiner

```
obtaining a difference between the characteristic parameter of the      S410
waveform of the pulse detecting signal and a characteristic
parameter of the predetermined waveform
```

```
correcting the pulse detecting signal according to the difference      S420
```

DETECTING METHOD AND DETECTING CIRCUIT OF LCD PANEL

FIELD

The present disclosure relates to display technologies, and more particularly, to a detecting method and a detecting circuit of a liquid crystal display (LCD) panel.

BACKGROUND

Thin film transistor liquid crystal display (TFT-LCD) technologies use an input voltage signal to control an inversion of the liquid crystal and achieve purposes of displaying light intensity and color accompanying with color resistances and a polarizing plate. In order to ensure product quality and improve a yield, it is necessary to perform a cell test on the display unit inside the panel after the LCD panel product is boxed. The cell test is generally performed by injecting a voltage signal to the display panel.

At present, a lighting method with a shorting bar is widely used. In detail, the shorting bar is shorted to a gate line or a data line to supply a signal for the cell test to detect various abnormalities occurring inside the LCD panel. Such detecting method needs a pulse signal generator (P/G) to control a generation of voltage pulse signals. The method has impedance and other reasons, which will cause the voltage pulse to be distorted and cannot certainly light up pixels of the TFT-LCD panel, resulting in error of operator detection or equipment automatic detection.

SUMMARY

In view of the above, the present disclosure provides a detecting method and a detecting circuit of a display panel to solve an issue of an error in a detecting signal (voltage pulse signal) of a display panel in prior art, and an issue that pixels of the display panel cannot be certainly lit up, resulting in errors of operator detection or equipment automatic detection.

In order to achieve above-mentioned object of the present disclosure, one embodiment of the disclosure provides a detecting method of a liquid crystal display panel, including steps of: a detecting module in real time detecting a waveform of a pulse detecting signal inputted into the liquid crystal display panel, providing a feedback of the waveform of the pulse detecting signal to a pulse signal output module; determining whether the waveform of the pulse detecting signal is deformed by the pulse signal output module; correcting the pulse detecting signal by the pulse signal output module if the waveform of the pulse detecting signal is determined to be deformed; and inputting a corrected pulse detecting signal to the liquid crystal display panel to detect the liquid crystal display panel.

In one embodiment of the detecting circuit for the liquid crystal display panel of the disclosure, the step of determining whether the waveform of the pulse detecting signal is deformed by the pulse signal output module, includes steps of: obtaining a characteristic parameter of the waveform of the pulse detecting signal by the pulse signal output module; and comparing the characteristic parameter with a characteristic parameter of a predetermined waveform to determine whether the waveform of the pulse detecting signal is deformed.

In one embodiment of the detecting circuit for the liquid crystal display panel of the disclosure, the characteristic parameter of the waveform of the pulse detecting signal includes at least one of an amplitude of the pulse detecting signal, a rise time of the pulse detecting signal, a fall time of the pulse detecting signal, a pulse width of the pulse detecting signal, and a repeating period of the pulse detecting signal.

In one embodiment of the detecting circuit for the liquid crystal display panel of the disclosure, the step of correcting the pulse detecting signal by the pulse signal output module, includes steps of: obtaining a difference between the characteristic parameter of the waveform of the pulse detecting signal and a characteristic parameter of the predetermined waveform; and correcting the pulse detecting signal according to the difference.

In one embodiment of the disclosure, the detecting method of the liquid crystal display panel further including following steps before correcting the pulse detecting signal, wherein the steps includes: determining whether the pulse detecting signal is satisfied a correcting condition; and stopping from outputting the pulse detecting signal and alarming if the pulse detecting signal is determined not to satisfy the correcting condition.

Furthermore, another embodiment of the disclosure provides a detecting circuit for a liquid crystal display panel, including a pulse signal output module and a detecting module connected in sequence. The pulse signal output module outputs a pulse detecting signal configured to detect the liquid crystal display panel. The detecting module is configured to detect a waveform of the pulse detecting signal in real time and configured to provide a feedback of the waveform to the pulse signal output module. The pulse signal output module is configured to correct the pulse detecting signal if the waveform of the pulse detecting signal is determined to be deformed and configured to input a corrected pulse detecting signal to the liquid crystal display panel to detect the liquid crystal display panel.

In one embodiment of the detecting circuit for the liquid crystal display panel of the disclosure, the pulse signal output module is further configured to obtain a characteristic parameter of the waveform of the pulse detecting signal and configured to compare the characteristic parameter with a characteristic parameter of a predetermined waveform to determine whether the waveform of the pulse detecting signal is deformed.

In one embodiment of the detecting circuit for the liquid crystal display panel of the disclosure, the characteristic parameter of the waveform of the pulse detecting signal includes at least one of an amplitude of the pulse detecting signal, a rise time of the pulse detecting signal, a fall time of the pulse detecting signal, a pulse width of the pulse detecting signal, and a repeating period of the pulse detecting signal.

In one embodiment of the detecting circuit for the liquid crystal display panel of the disclosure, the pulse signal output module is further configured to obtain a difference between the characteristic parameter of the waveform of the pulse detecting signal and a characteristic parameter of the predetermined waveform and configured to correct the pulse detecting signal according to the difference.

In one embodiment of the detecting circuit for the liquid crystal display panel of the disclosure, the pulse signal output module is further configured to stop from outputting the pulse detecting signal and configured to alarm if the pulse detecting signal is determined not to satisfy the correcting condition.

In comparison with prior art, the detecting method and detecting circuit of detecting signal of a display panel provide the steps of: in real time detecting a waveform of a pulse detecting signal inputted into the liquid crystal display panel, comparing the waveform of the pulse detecting signal and the waveform of the predetermined pulse signal, and correcting automatically to prevent from image abnormalities resulted from a short bar lit-up method, reduce over checking or missing, and find out defects quickly and correctly by operators or detecting equipment to enhance quality and benefits and to reduce cost.

BRIEF DESCRIPTION OF DRAWINGS

In order to more clearly illustrate the embodiments of the present application or the technical solutions in the prior art, the drawings used in the embodiments will be briefly described below. The drawings in the following description are only partial embodiments of the present application, and those skilled in the art can obtain other drawings according to the drawings without any creative work.

DETAILED DESCRIPTION

In the following, the technical solutions in the embodiments of the present application will be clearly and completely described with reference to the drawings in the embodiments of the present application. Obviously, the described embodiments are only a part of the embodiments of the present application, not all of the embodiments. Based on the embodiments in the present application, all other embodiments obtained by a person of ordinary skill in the art without creative efforts shall fall within the protection scope of the present application.

The terms "first," "second," and "third" in this application are used for descriptive purposes only, and should not be interpreted as indicating or implying relative importance or implicitly indicating the number of technical features indicated. Therefore, the features defined as "first", "second", and "third" may explicitly or implicitly include at least one of the features. In the description of the present application, the meaning of "a plurality" is at least two, for example, two, three, etc., unless it is specifically and specifically defined otherwise. All directional indicators (such as up, down, left, right, front, back, etc.) in the embodiments of the present application are only used to explain the relative positional relationship between components in a specific posture (as shown in the drawing), Movement, etc., if the specific posture changes, the directional indication will change accordingly.

Reference to "an embodiment" herein means that a particular feature, structure, or characteristic described in connection with the embodiment may be included in at least one embodiment of the present application. The appearances of this phrase in various places in the specification are not necessarily all referring to the same embodiment, nor are they independent or alternative embodiments that are mutually exclusive with other embodiments. It is clearly and implicitly understood by those skilled in the art that the embodiments described herein may be combined with other embodiments.

Figure 1:
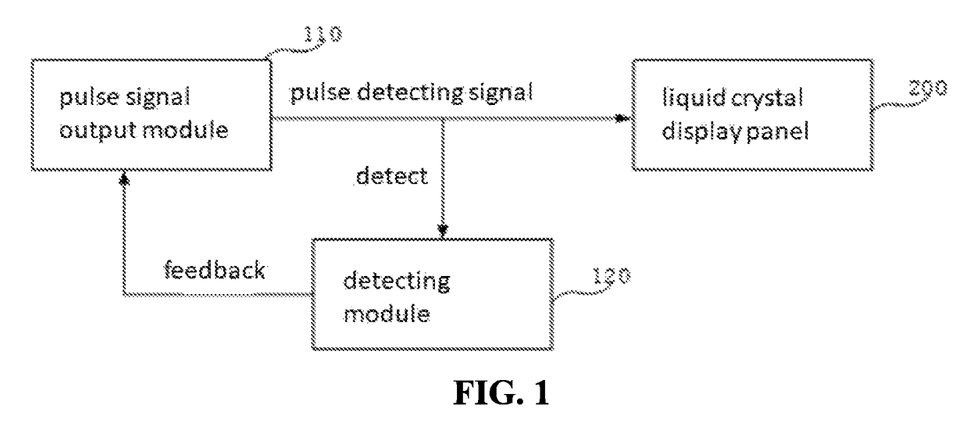
FIG. 1 is a schematic view of a structure of a detecting circuit of a liquid crystal display (LCD) panel according to an embodiment of the present disclosure.

Referring to FIG. 1, FIG. 1 is a schematic view of a structure of a detecting circuit of a liquid crystal display (LCD) panel according to an embodiment of the present disclosure. Referring to FIG. 1, one embodiment of the disclosure provides a detecting circuit for a liquid crystal display panel 200, including a pulse signal output module 110 and a detecting module 120. The pulse signal output module 110 outputs a pulse detecting signal configured to detect the liquid crystal display panel 200. The pulse signal output module 110 can control and produce the pulse detecting signal (voltage pulse signal) by a pulse signal generator (P/G). The detecting module 120 is configured to detect the pulse detecting signal in real time and configured to provide a feedback of the pulse signal to the pulse signal output module 110 in real time.

Figure 2:
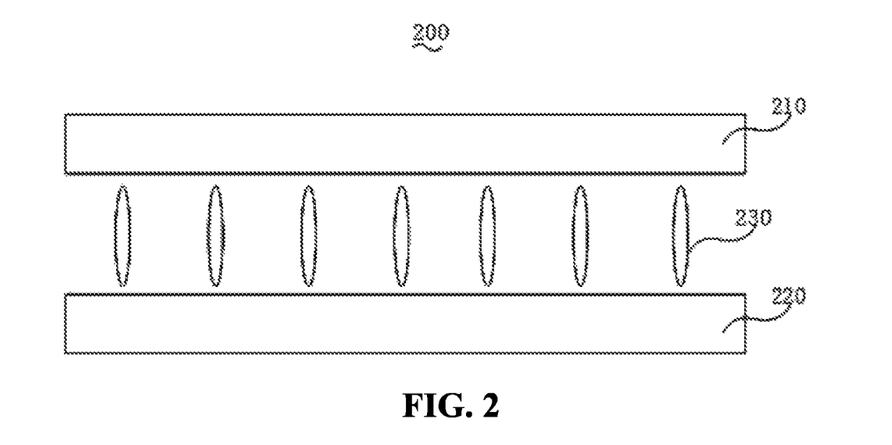
FIG. 2 is a schematic view of a structure of an LCD panel according to an embodiment of the present disclosure.

Optionally, referring to FIG. 2, FIG. 2 is a schematic view of a structure of a LCD panel according to an embodiment of the present disclosure. The LCD panel 200 in the disclosure can include a first substrate 210, a second substrate 220 disposed opposite to the first substrate 210, and liquid crystal 230 disposed between the first substrate 210 and the second substrate 220.

Figure 3:
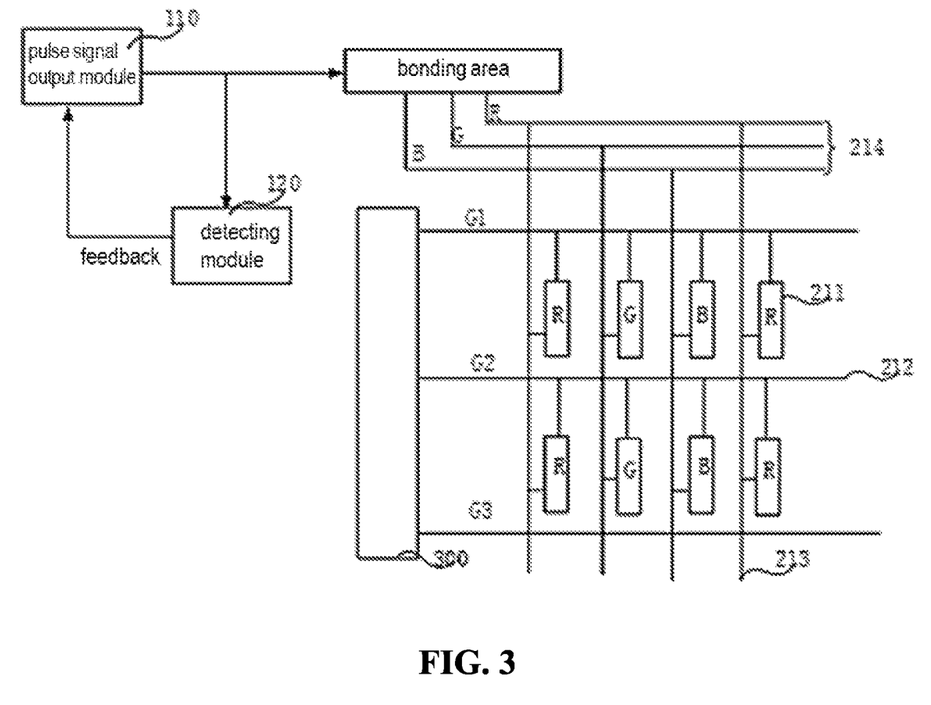
FIG. 3 is a schematic view of an application of a detecting circuit of LCD panel according to an embodiment of the present disclosure.

Further referring to FIG. 3, FIG. 3 is a schematic view of an application of a detecting circuit of LCD panel according to an embodiment of the present disclosure. The first substrate 210 can include a display region and a non-display region surrounding the display region. The display region is provided with a plurality of pixel electrodes 211 arranged in an array, a plurality of gate lines 212, and a plurality of data lines 213. Optionally, the pixel electrodes 211 in the disclosure can be red sub-pixel electrodes R, green sub-pixel electrode G, or blue sub-pixel electrode B, the disclosure is not limited this feature here.

Optionally, the non-display region is provided with a plurality of shorting bar 214 configured to test the pixel electrodes of the LCD panel. Every one of the shorting bars 214 is connected to the data lines 213. Every one of the gate lines 212 is connected to a gate driving circuit 300 to provide a gate driving signal to the LCD panel 200 allowing the pulse detecting signal reached every one of the pixel electrodes 211. In detail, in the disclosure, the shorting bars 214 are configured to connected individual data lines 213 with each other. The pulse detecting signals are provided to the pixel electrodes 211 through the plurality of shorting bars 214 connected to the pulse signal output module 110 of the disclosure to test the LCD panel. A test of the pixel electrode 211 by the pulse detecting signal can light up all of the pixel electrodes 211 by the pulse detecting signal or light up the pixel electrodes 211 with a same color or with the same two colors. The disclosure is not limited this feature here.

In addition, an arrangement of the pixel electrodes 211 in the present application may also be in other arrangements.

Here, only a kind of the arrangements is given schematically. In other embodiments, other arrangements may also be used, which are not limited herein.

Optionally, before the liquid crystal display panel is boxed, each pixel in the panel needs to be tested. Generally, the plurality of shorting bars 214 can be directly connected to the pulse signal output module (P/G) 110. The pulse signal output module 110 directly controls the generation of a pulse voltage signal to detect the pixels in the liquid crystal display panel. However, the pulse signal output module 110 may have impedance to cause voltage pulse distortion, so a test of an image of the liquid crystal display panel cannot be accurately implemented. Therefore, the disclosure provides a detecting module 120 on a signal output line of the pulse signal output module 110 to detect the pulse detecting signal (pulse voltage signal) output by the pulse signal output module 110 in real time to prevent it from being inaccurate on the image test of the LCD panel due to distortion.

Figure 4:
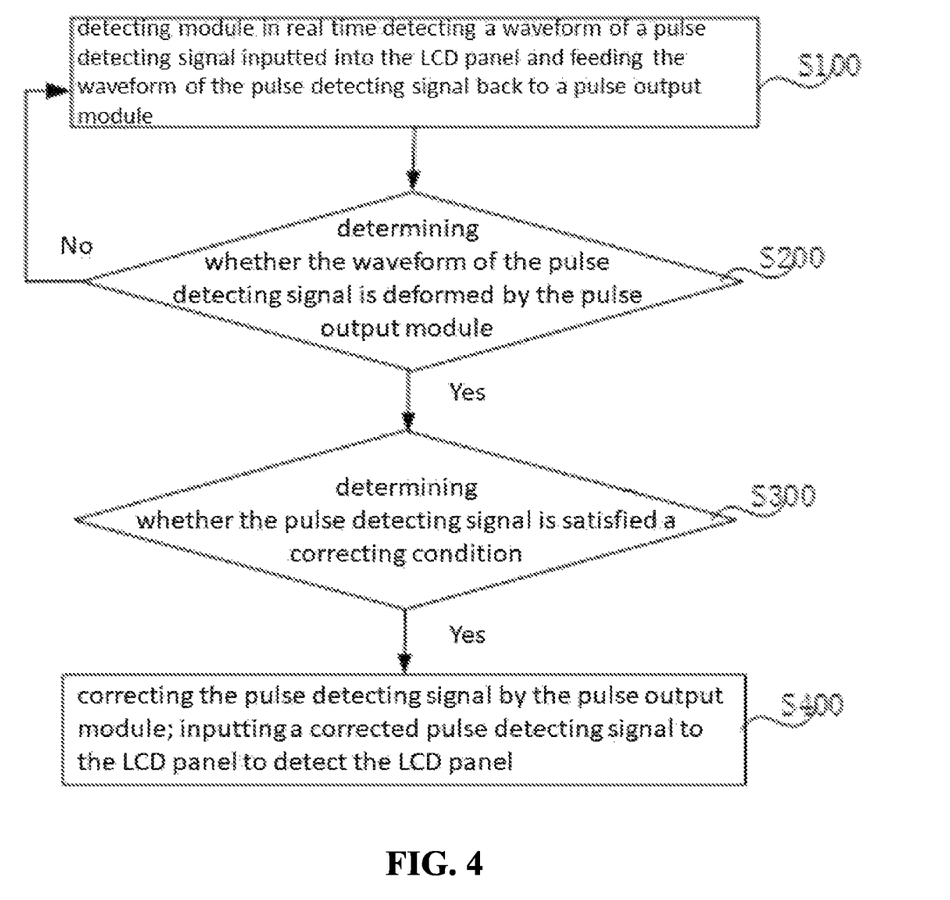
FIG. 4 is a schematic flowchart of a detecting method of an LCD panel according to a first embodiment of the present disclosure.

Further referring to FIG. 4, FIG. 4 is a schematic flowchart of a detecting method of a LCD panel according to a first embodiment of the present disclosure. As shown in FIG. 4, one embodiment of the disclosure provides a detecting method based on the abovementioned detecting circuit 100, including steps of:

At step S100: a detecting module in real time detecting a waveform of a pulse detecting signal inputted into the liquid crystal display panel and providing a feedback of the waveform of the pulse detecting signal to a pulse signal output module.

In step S100, the abovementioned pulse signal output module 110 of the detecting circuit controls and generates the pulse detecting signal configured to detect the LCD panel. The detecting module 120 in real time detects and monitors a waveform of the voltage pulse signal. Then, provides a feedback of the voltage pulse signal to the pulse signal output module 110. Optionally, the detecting module in the disclosure can be an oscilloscope, such as an electronic oscilloscope, an analog oscilloscope, a digital oscilloscope, and the like. Of course, ordinary instruments such as a multi-meter can be used to directly display the waveform of the voltage pulse signal and read its characteristic parameters. There is no limitation here.

At step S200: determining whether the waveform of the pulse detecting signal is deformed by the pulse signal output module.

Optionally, the voltage pulse signal output from the signal output module 110 may be decayed due to over large impedance and other interference factors, so that the waveform of the output detecting signal is deformed, and the liquid crystal display panel cannot be driven accurately in a lit-up test. Problems such as abnormal image caused by factors other than the liquid crystal display panel itself are occurred. Therefore, it is impossible to check whether the panel is qualified, so it is necessary to perform real-time detection on the detecting signal output from the signal output module 110.

Figure 5:
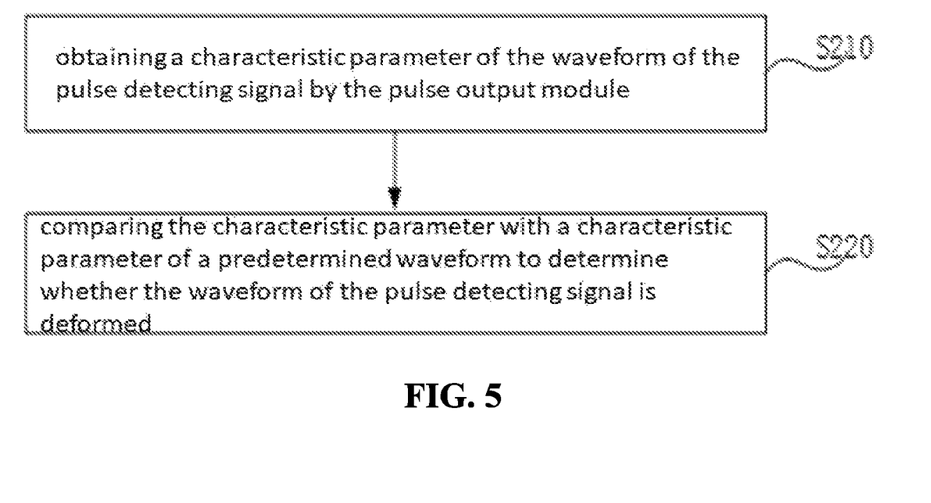
FIG. 5 is a schematic flowchart of a step S200 according to an embodiment of FIG. 4.

Further referring to FIG. 5, FIG. 5 is a schematic flowchart of the step S200 according to an embodiment of the disclosure. As shown in FIG. 5, the step S200 further includes following sub-steps of:

At step S210: obtaining a characteristic parameter of the waveform of the pulse detecting signal by the pulse signal output module.

The pulse detecting signal in the present disclosure may be a rectangular wave or a square wave pulse signal, that is, a voltage that is abruptly changed within a certain time. In this disclosure, a rectangular wave is taken as an example to introduce in detail. Optionally, for the voltage pulse required for the image test of the liquid crystal display panel, a difference between the waveform of the pulse voltage signal output from the pulse signal output module 110 and a waveform of a predetermined voltage pulse signal (ideally without the influence of impedance and other factors) is the smaller, the better.

Figure 6A:
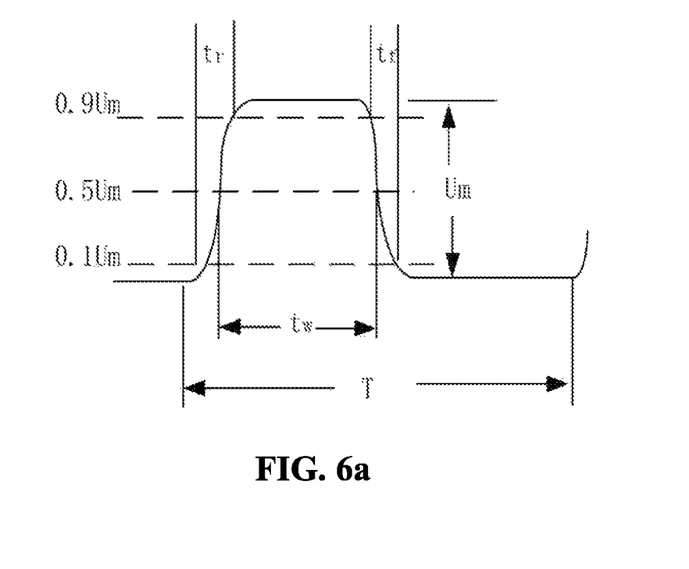
FIGS. 6a, 6b are schematic comparing diagrams between a predetermined pulse signal and a real pulse detecting signal according to an embodiment of the present disclosure.

Optionally, FIG. 6 is a schematic comparing diagram between a predetermined pulse signal and a real pulse detecting signal according to an embodiment of the present disclosure. As shown in FIG. 6a, for a pulse signal, the characteristic parameters that can characterize the characteristics of the pulse signal mainly include an amplitude Um of the pulse signal, a rise time $t_r$ of the pulse signal referring to a time required when the pulse signal rises from 0.1 Um to 0.9 Um, a fall time $t_f$ referring to a time required when the pulse signal falls from 0.9 Um to 0.1 Um, a pulse width $t_w$ of the pulse signal referring to a required duration of the pulse signal from a rise edge of 0.5 Um to a fall edge 0.5 Um of the pulse signal, and a repetition period T of the pulse signal.

In the step S210, the pulse signal output module 110 obtains the waveform of the pulse detection signal fed back by the detecting module 120 in real time, and further obtains characteristic parameters of the waveform. In the disclosure, the characteristic parameters may be at least one or combination of the parameters of the waveforms described above. There is not limited here.

At step S220: comparing the characteristic parameter with a characteristic parameter of a predetermined waveform to determine whether the waveform of the pulse detecting signal is deformed.

Figure 6B:
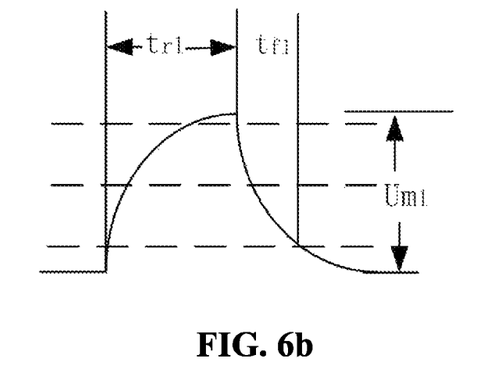

Optionally, if the rise time tr1, the fall time tf1, and the amplitude Um1 of an obtained pulse detecting signal as the waveform shown in FIG. 6b are changed comparing to the waveform of the predetermined pulse signal as shown in FIG. 6a, it can determine that the waveform signal be deformed.

At step S300: determining whether the pulse detecting signal is satisfied a correcting condition.

In the step S300, it needs to further confirm whether the pulse detecting signal satisfied the correcting condition of the pulse signal output module 110 is the waveform of the pulse detecting signal is determined to be deformed. In detail, when a voltage of the pulse detecting signal needed to be corrected is greater than a working voltage of the pulse signal output module, the pulse detecting signal cannot correct. In other embodiment of the disclosure, if a signal cannot output normal due to a broken of a device connected to the LCD panel, the correcting condition is not satisfied and the process enters the step S500 directly. Otherwise, if the pulse detecting signal is determined to satisfy the correcting condition, the process enters a step S400.

At step S400: correcting the pulse detecting signal by the pulse signal output module if the waveform of the pulse detecting signal is determined to be deformed and inputting a corrected pulse detecting signal to the liquid crystal display panel to detect the liquid crystal display panel.

Figure 7:
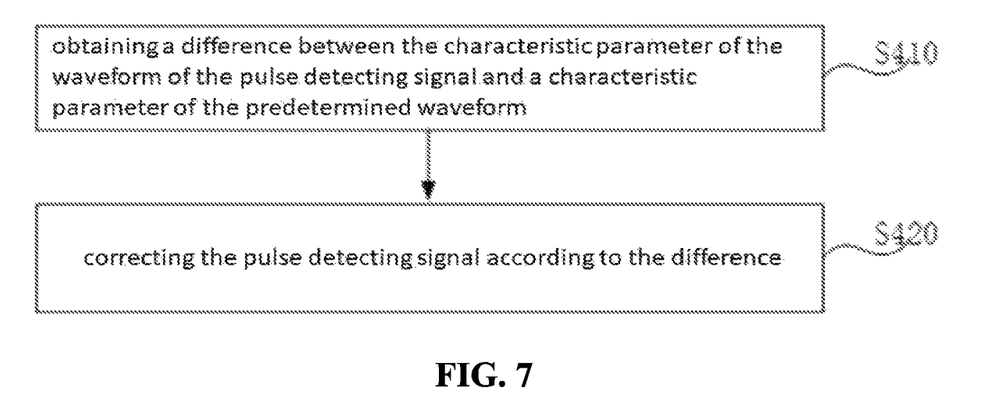
FIG. 7 is a schematic flowchart of a step S400 according to an embodiment of FIG. 4.

Referring to FIG. 7, FIG. 7 is a schematic flowchart of the step S400 according an embodiment of the disclosure. As shown in FIG. 7, the step S400 further includes following sub-steps:

At step S410: obtaining a difference between the characteristic parameter of the waveform of the pulse detecting signal and a characteristic parameter of the predetermined waveform.

The disclosure adds correcting function to the pulse signal output module 110 of the detecting circuit 100 to realize automatically correction of pulse detecting signal within a normal working range (a maximal voltage of the pulse detecting signal needed to correct is less than a working voltage range of the pulse signal output module 110) of the pulse signal output module 110. In detail, the difference between the character parameter of the waveform of the predetermined pulse signal and the character parameter of the waveform of the pulse detecting signal is a difference calculated from the rise times of the pulse signal, from the fall times of the pulse signal, or the amplitudes of the pulse signal. The disclosure is not limited this feature.

At step S420: correcting the pulse detecting signal according to the difference.

Correcting the pulse detecting signal according to the difference to make the waveform approach the waveform signal of the predetermined pulse after obtaining a difference between the characteristic parameter of the waveform of the predetermined pulse signal and the characteristic parameter of the waveform of the pulse detecting signal. In detail, take the amplitude of the pulse signal for example, if an difference of the amplitudes between the obtained pulse detecting signal and the predetermined pulse signal is U1, the pulse signal output module 110 can increase U1 of the amplitude of the pulse detecting signal according to the difference U1 to make the amplitude of the waveform of the output pulse be near Um. Of course, corrections of other characteristic parameters and the correction of the amplitude are similar, and are not repeated here. Optionally, the voltage values of the pulse detection signals required by different liquid crystal display panels in the embodiments of the present disclosure are different. In an actual application scenario, the voltage values of the pulse detection signals may be determined according to test requirements of an actual liquid crystal display panel, which is not limited here.

In the abovementioned embodiment, by steps of in real time detecting a waveform of a pulse detecting signal of the liquid crystal display panel, comparing the waveform of the pulse detecting signal and the waveform of the predetermined pulse signal, and correcting automatically to prevent from image abnormalities resulted from a short bar lit-up method, reduce over checking or missing, and find out defects quickly and correctly by operators or detecting equipment to realize an automatic factory, to reduce waste of cost, to enhance quality and benefits and to reduce cost.

Figure 8:
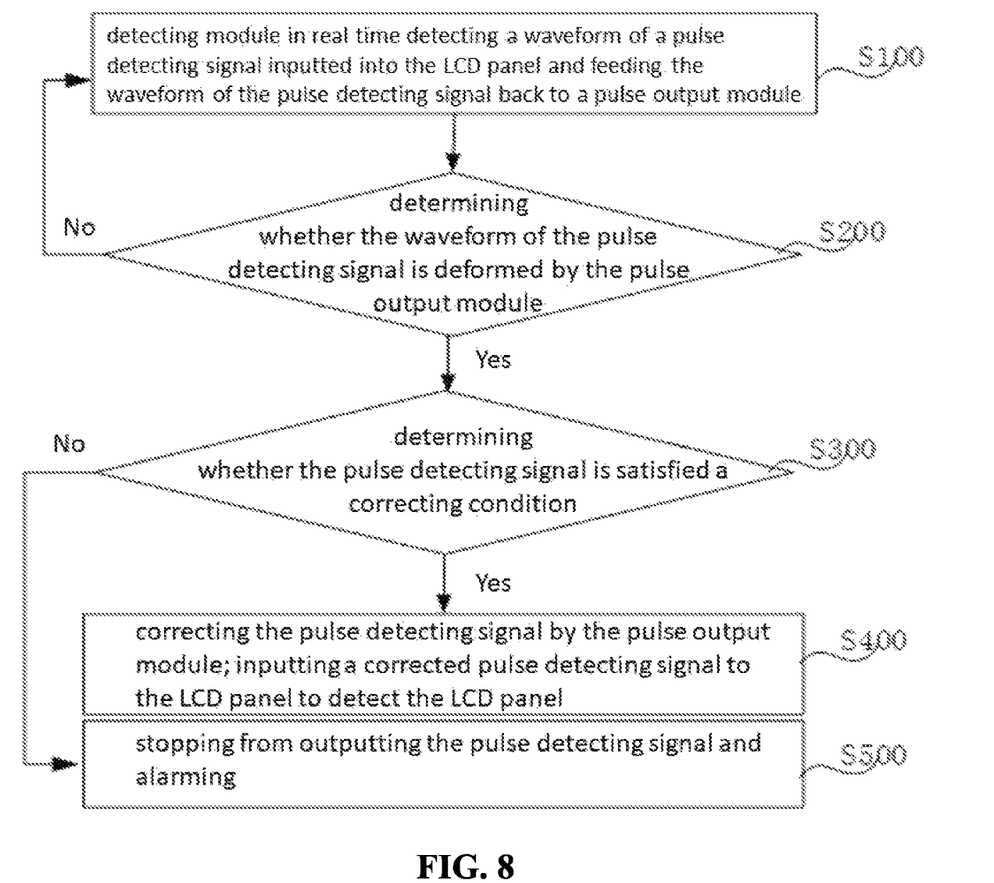
FIG. 8 is a schematic flowchart of a detecting method of an LCD panel according to a second embodiment of the present disclosure.

Referring to FIG. 8, FIG. 8 is a schematic flowchart of a detecting method of a LCD panel according to a second embodiment of the present disclosure. It should be noted that this embodiment is a further extension of the first embodiment of the display panel detection method. The difference is that in this embodiment, when it is determined that the pulse detecting signal does not meet the correcting conditions, the pulse signal output module directly stops running and alarms reminder. The same points are not repeated. Detail steps are as following:

At step S100: a detecting module in real time detecting a waveform of a pulse detecting signal inputted into the liquid crystal display panel and providing a feedback of the waveform of the pulse detecting signal to a pulse signal output module.

At step S200: determining whether the waveform of the pulse detecting signal is deformed by the pulse signal output module.

At step S300: determining whether the pulse detecting signal is satisfied a correcting condition.

In the step S300, it needs to further confirm whether the pulse detecting signal satisfied the correcting condition of the pulse signal output module 110 is the waveform of the pulse detecting signal is determined to be deformed. In detail, when a voltage of the pulse detecting signal needed to be corrected is greater than a working voltage of the pulse signal output module, the pulse detecting signal cannot correct. In other embodiment of the disclosure, if a signal cannot output normal due to a broken of a device connected to the LCD panel, the correcting condition is not satisfied and the process enters the step S500 directly. Otherwise, if the pulse detecting signal is determined to satisfy the correcting condition, the process enters a step S400.

At step S400: correcting the pulse detecting signal by the pulse signal output module if the waveform of the pulse detecting signal is determined to be deformed and inputting a corrected pulse detecting signal to the liquid crystal display panel to detect the liquid crystal display panel.

At step S500: stopping from outputting the pulse detecting signal and alarming.

In step S500, if it is determined that the pulse detecting signal cannot be corrected, the pulse signal output module directly stops running and gives an alarm reminder, so that the operator can detect the problem in time and solve it in time. The above embodiment considers the issue that the P/G output pulse signal is distorted and cannot accurately detect the LCD panel. A triple lock mechanism of automatic detection, automatic correction, and automatic alarm is designed to detect the pulse detection signal output from the P/G in real time. It can prevent from image abnormalities resulted from a short bar lit-up method, reduce over checking or missing, and find out defects quickly and correctly by operators or detecting equipment.

In the abovementioned embodiment, by steps of in real time detecting a waveform of a pulse detecting signal of the liquid crystal display panel, comparing the waveform of the pulse detecting signal and the waveform of the predetermined pulse signal, and correcting automatically to prevent from image abnormalities resulted from a short bar lit-up method, reduce over checking or missing, and find out defects quickly and correctly by operators or detecting equipment to realize an automatic factory, to reduce waste of cost, to enhance quality and benefits and to reduce cost.

In summary, those skilled in the art can easily understand that the detecting method and detecting circuit of detecting signal of a display panel provide the steps of: in real time detecting a waveform of a pulse detecting signal inputted into the liquid crystal display panel, comparing the waveform of the pulse detecting signal and the waveform of the predetermined pulse signal, and correcting automatically to prevent from image abnormalities resulted from a shorting bar lit-up method, reduce over checking or missing, and find out defects quickly and correctly by operators or detecting equipment to enhance quality and benefits and to reduce cost.

The present disclosure has been described by the above embodiments, but the embodiments are merely examples for implementing the present disclosure. It must be noted that the embodiments do not limit the scope of the invention. In contrast, modifications and equivalent arrangements are intended to be included within the scope of the invention.

What is claimed is:
1. A detecting method of a liquid crystal display panel, comprising steps of:
a detecting module in real time detecting a waveform of a pulse detecting signal inputted into the liquid crystal display panel, and providing a feedback of the waveform of the pulse detecting signal to a pulse signal output module;
determining whether the waveform of the pulse detecting signal is deformed by the pulse signal output module;
determining whether the pulse detecting signal is satisfied a correcting condition if the waveform of the pulse detecting signal is determined to be deformed; and
correcting the pulse detecting signal by the pulse signal output module if the waveform of the pulse detecting signal is determined to be satisfied the correcting condition, and inputting a corrected pulse detecting signal to the liquid crystal display panel to detect the liquid crystal display panel, wherein the correcting condition is that a voltage of the pulse detecting signal after corrected is equal to or less than a working voltage of the pulse signal output module.

2. The detecting method of the liquid crystal display panel according to claim 1, wherein the step of determining whether the waveform of the pulse detecting signal is deformed by the pulse signal output module, comprises steps of:
obtaining a characteristic parameter of the waveform of the pulse detecting signal by the pulse signal output module; and
comparing the characteristic parameter with a characteristic parameter of a predetermined waveform to determine whether the waveform of the pulse detecting signal is deformed.

3. The detecting method of the liquid crystal display panel according to claim 2, wherein the characteristic parameter of the waveform of the pulse detecting signal comprises at least one of an amplitude of the pulse detecting signal, a rise time of the pulse detecting signal, a fall time of the pulse detecting signal, a pulse width of the pulse detecting signal, and a repeating period of the pulse detecting signal.

4. The detecting method of the liquid crystal display panel according to claim 3, wherein the step of correcting the pulse detecting signal by the pulse signal output module, comprises steps of:
obtaining a difference between the characteristic parameter of the waveform of the pulse detecting signal and a characteristic parameter of the predetermined waveform; and
correcting the pulse detecting signal according to the difference.

5. The detecting method of the liquid crystal display panel according to claim 1, further comprising following steps before correcting the pulse detecting signal, wherein the steps comprises:
stopping from outputting the pulse detecting signal and alarming if the pulse detecting signal is determined not to satisfy the correcting condition.

6. A detecting circuit for a liquid crystal display panel, comprising a pulse signal output module and a detecting module;
wherein the pulse signal output module outputs a pulse detecting signal configured to detect the liquid crystal display panel, the detecting module is configured to detect a waveform of the pulse detecting signal in real time and configured to provide a feedback of the waveform to the pulse signal output module, and the pulse signal output module is configured to determine whether the pulse detecting signal is satisfied a correcting condition if the waveform of the pulse detecting signal is determined to be deformed, configured to correct the pulse detecting signal if the waveform of the pulse detecting signal is determined to be satisfied the correcting condition, and configured to input a corrected pulse detecting signal to the liquid crystal display panel to detect the liquid crystal display panel, wherein the correcting condition is that a voltage of the pulse detecting signal after corrected is equal to or less than a working voltage of the pulse signal output module.

7. The detecting circuit for the liquid crystal display panel according to claim 6, wherein the pulse signal output module is further configured to obtain a characteristic parameter of the waveform of the pulse detecting signal and configured to compare the characteristic parameter with a characteristic parameter of a predetermined waveform to determine whether the waveform of the pulse detecting signal is deformed.

8. The detecting circuit for the liquid crystal display panel according to claim 7, wherein the characteristic parameter of the waveform of the pulse detecting signal comprises at least one of an amplitude of the pulse detecting signal, a rise time of the pulse detecting signal, a fall time of the pulse detecting signal, a pulse width of the pulse detecting signal, and a repeating period of the pulse detecting signal.

9. The detecting circuit for the liquid crystal display panel according to claim 8, wherein the pulse signal output module is further configured to obtain a difference between the characteristic parameter of the waveform of the pulse detecting signal and a characteristic parameter of the predetermined waveform and configured to correct the pulse detecting signal according to the difference.

10. The detecting circuit for the liquid crystal display panel according to claim 6, wherein the pulse signal output module is further configured to stop from outputting the pulse detecting signal and configured to alarm if the pulse detecting signal is determined not to satisfy the correcting condition.

* * * * *